Aug. 24, 1937.
C. BASHAM
2,090,973
LAWN CULTIVATOR
Filed June 15, 1936
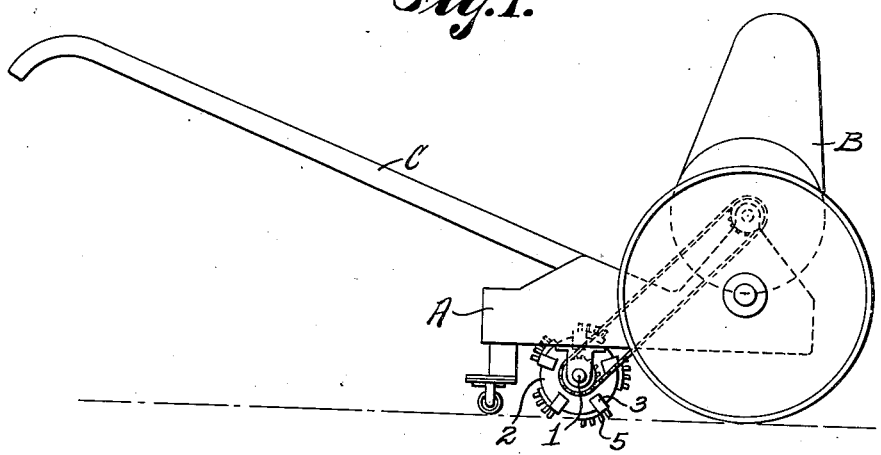
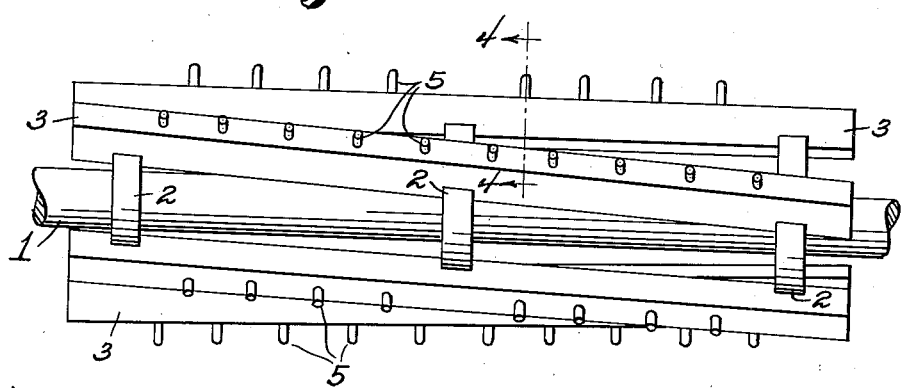
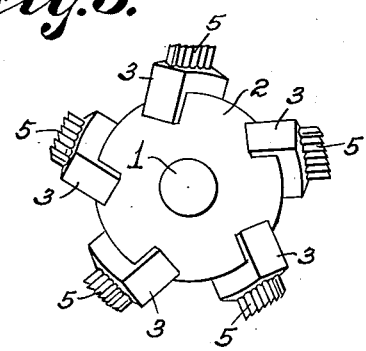
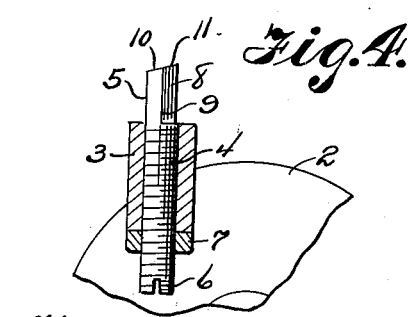
Clement Basham
INVENTOR
BY Victor J. Evans & Co.
ATTORNEYS Patented Aug. 24, 1937

2,090,973

UNITED STATES PATENT OFFICE 2,090,973

LAWN CULTIVATOR

Clement Basham, Fort Worth, Tex.

Application June 15, 1936, Serial No. 85,407

1 Claim. (Cl. 97—41)

This invention relates to cultivators, and its general object is to provide a cultivating device that is primarily designed for use on lawns, to beautify and promote the proper growth thereof, in that it is capable of removing tufted or bunched grass, weeds and the like therefrom, and cutting away the runners of Bermuda and like undesirable grass, as well as breaking up and leveling the surface of the soil, without materially disturbing the desirable blade grass, thereby leaving the latter to grow in a healthy state.

A further object of the invention is to provide a cultivating device of the character set forth, that can be used with a unit embodying motive power means as shown, or as an attachment for a motive power lawn mower, by replacing the stationary and reel blades thereof.

Another object of the invention is to provide a cultivating device in the form of a reel that includes raking and cutting means having adjustably mounted teeth.

A still further object of the invention is to provide a cultivating device that is simple in construction, inexpensive to manufacture, easy to apply and extremely efficient in use, operation and service.

This invention also consists in certain other features of construction and in the combination and arrangement of the several parts, to be hereinafter fully described, illustrated in the accompanying drawing and specifically pointed out in the appended claim.

In describing the invention in detail, reference will be had to the accompanying drawing wherein like characters denote like or corresponding parts throughout the several views, and in which:

Figure 1 is a side view illustrating my device applied to a motive power propelling and operating means therefor.

Figure 2 is a top plan view of the device per se.

Figure 3 is an end view thereof.

Figure 4 is a sectional view taken approximately on line 4—4 of Figure 2.

Referring to the drawing in detail, the letter A indicates a wheeled frame supporting an engine B for driving or operating my device, the frame having secured thereto guiding handles C, all of which form no part of the present invention and is shown for the purpose of illustrating one application of my cultivator device which can likewise be applied to any motive power driven lawn mower, by replacing the stationary and reel blades thereof by my device.

The frame as shown has bearings secured to and depending from the under side thereof and in which is journaled the ends of the shaft 1 of my device, that is rotated or driven by sprocket and chain connecting means between the shaft and the engine B. Suitable gearing may be employed for that purpose.

The shaft has secured thereto disk members 2 which may be in the form of spiders, but in any event are disposed in equi-distantly spaced relation with respect to each other as clearly shown in Figure 2.

Secured to the disk members 2 and disposed concentrically and at an inclination with respect to the longitudinal axis of the shaft 1 is a plurality of bars 3 which are preferably set in recesses in the disk members, and the bars cooperate with the disk members and shaft to provide a reel.

Each of the bars 3 are provided with threaded bores extending along the length thereof, and these bores are screw threaded to threadedly receive the shanks 4 of teeth 5, the shanks having kerfed ends 6 for threading the same with respect to the bores by the use of a screw driver or the like, and the teeth are held in adjusted position through the instrumentality of lock nuts 7.

The teeth are preferably round in cross section for the major portion of their length, but the working end portions thereof, are laterally flattened as at 8 to provide cutting edges 9, and the outer ends of the teeth are beveled as at 10 to provide a cutting edge 11.

The teeth are preferably of equal length and project an equal distance from the outer surfaces of the bars 3, with the flat faces thereof arranged whereby one of the cutting edges 9 of each tooth is disposed to perform its cutting function, and to cooperate with the cutting edge 11 for that purpose. However, it will be apparent that the teeth likewise perform a raking function, and as they pass over the lawn surface, they not only remove the cut tufted grass, weeds and runners of creeping grasses, but likewise break up and level the surface of the soil, thereby beautifying the lawn and leaving the desirable blade grass a chance to grow, without interference from the destructive weeds and undesirable grasses.

It is thought from the foregoing description that the advantages and novel features of the invention will be readily apparent.

It is to be understood that changes may be made in the construction and in the combination and arrangement of the several parts, provided that such changes fall within the scope of the appended claim.

What I claim is:

A lawn cultivating device for use with motive power driving means including a frame, said device comprising a reel having a shaft mounted for rotation in the frame, means for rotating the shaft from the driving means, disk means mounted on the shaft, bars seated in and secured to the disk means, said bars disposed concentrically of and at an inclination with respect to the longitudinal axis of the shaft, kerfed teeth threadedly mounted in the bars and extending outwardly therefrom, locking means for the teeth and each tooth having a beveled outer end and a flat face extending longitudinally of the tooth to the outer end thereof, said flat face providing cutting edges along the sides thereof and the meeting of the beveled end and flat face providing an outer cutting edge.

CLEMENT BASHAM.